(12) United States Patent
Kim et al.

(10) Patent No.: US 12,081,861 B2
(45) Date of Patent: Sep. 3, 2024

(54) METHOD FOR PROVIDING IMAGE AND ELECTRONIC DEVICE SUPPORTING THE SAME

(71) Applicant: Samsung Electronics Co., Ltd., Gyeonggi-do (KR)

(72) Inventors: Beomsik Kim, Gyeonggi-do (KR); Jaehyoung Park, Gyeonggi-do (KR); Jaemyung Lee, Gyeonggi-do (KR)

(73) Assignee: Samsung Electronics Co., Ltd (KR)

( * ) Notice: Subject to any disclaimer, the term of this patent is extended or adjusted under 35 U.S.C. 154(b) by 107 days.

(21) Appl. No.: 17/893,604

(22) Filed: Aug. 23, 2022

(65) Prior Publication Data

US 2023/0070184 A1    Mar. 9, 2023

Related U.S. Application Data

(63) Continuation of application No. PCT/KR2022/012543, filed on Aug. 22, 2022.

(30) Foreign Application Priority Data

Aug. 23, 2021    (KR) .................. 10-2021-0110863

(51) Int. Cl.
  *G06V 10/00*    (2022.01)
  *G06V 10/25*    (2022.01)
  (Continued)

(52) U.S. Cl.
  CPC ........... *H04N 23/633* (2023.01); *G06V 10/25* (2022.01); *H04N 23/90* (2023.01)

(58) Field of Classification Search
  CPC ...... H04N 23/633; H04N 23/90; H04N 23/54; H04N 23/81; H04N 17/002; H04N 23/80;
  (Continued)

(56) References Cited

U.S. PATENT DOCUMENTS 4,398,811 A * 8/1983 Nishioka ............ G02B 23/2407
                                                385/117
4,622,954 A * 11/1986 Arakawa .............. A61B 1/0051
                                                600/153
(Continued)

FOREIGN PATENT DOCUMENTS

CN    109979382        7/2019
CN    112004077        11/2020
(Continued)

OTHER PUBLICATIONS

Zhou et al. Image Restoration for Under-Display Camera, https://www.semanticscholar.org/reader/2050ca7f9535710f74d698f4fc227eade31d546b arXiv:2003.04857v1 [cs.CV] Mar. 10, 2020.*

(Continued)

*Primary Examiner* — Frank F Huang
(74) *Attorney, Agent, or Firm* — The Farrell Law Firm, P.C.

(57) ABSTRACT

An electronic device is provided and includes a display, a camera configured to acquire an image using light introduced through the display, and at least one processor configured to be electrically connected to the display and the camera, wherein the at least one processor is configured to acquire the image through the camera, acquire a first adjustment value corresponding to the display and for correcting the image, acquire a second adjustment value corresponding to the camera and for correcting the image, and correct the image based on the first adjustment value and the second adjustment value.

17 Claims, 9 Drawing Sheets

(51) Int. Cl.
*H04N 23/63* (2023.01)
*H04N 23/90* (2023.01)

(58) Field of Classification Search
CPC .......... H04N 5/77; H04N 23/57; H04N 23/62; H04N 23/67; H04N 23/88; G06V 10/25
See application file for complete search history.

(56) References Cited

U.S. PATENT DOCUMENTS

| | | | | |
|---|---|---|---|---|
| 4,905,082 | A * | 2/1990 | Nishigaki | A61B 1/07 600/109 |
| 5,557,454 | A * | 9/1996 | Takahashi | G02B 23/2415 348/45 |
| 6,025,873 | A * | 2/2000 | Nishioka | G02B 23/26 600/181 |
| 6,157,396 | A * | 12/2000 | Margulis | G06T 1/20 345/506 |
| 6,340,994 | B1 * | 1/2002 | Margulis | H04N 19/86 348/E9.037 |
| 6,362,877 | B1 * | 3/2002 | Kobayashi | G01R 31/281 356/614 |
| 6,537,208 | B1 * | 3/2003 | Konno | H04N 5/2253 348/340 |
| 2002/0163742 | A1 * | 11/2002 | Togino | G02B 17/02 359/837 |
| 2003/0097044 | A1 * | 5/2003 | Rovegno | A61B 1/07 600/173 |
| 2005/0085698 | A1 * | 4/2005 | Bonningue | A61B 1/00183 600/129 |
| 2005/0197533 | A1 * | 9/2005 | May | A61B 1/042 600/137 |
| 2007/0035706 | A1 * | 2/2007 | Margulis | H04N 9/3102 353/122 |
| 2007/0092135 | A1 | 4/2007 | Pirainen | |
| 2009/0292170 | A1 * | 11/2009 | Boebel | G02B 23/2415 600/111 |
| 2011/0292257 | A1 * | 12/2011 | Hatakeyama | G06T 5/92 348/E9.037 |
| 2012/0074851 | A1 | 3/2012 | Erinjippurath | |
| 2014/0071444 | A1 * | 3/2014 | Matsumoto | G01N 21/954 356/241.1 |
| 2016/0070414 | A1 | 3/2016 | Shukla et al. | |
| 2016/0119603 | A1 * | 4/2016 | Hayashi | H04N 9/646 348/222.1 |
| 2016/0241779 | A1 * | 8/2016 | Naruse | H04N 23/80 |
| 2016/0255324 | A1 * | 9/2016 | Kazakevich | G02B 23/2484 348/43 |
| 2016/0357007 | A1 * | 12/2016 | Swanson | G01B 9/02028 |
| 2018/0367786 | A1 * | 12/2018 | Furst | A61B 1/00096 |
| 2020/0169680 | A1 | 5/2020 | Park et al. | |
| 2021/0042496 | A1 | 2/2021 | Choe | |
| 2021/0368085 | A1 | 11/2021 | Ou et al. | |
| 2022/0070376 | A1 | 3/2022 | Lee et al. | |
| 2023/0370046 | A1 * | 11/2023 | Kimura | H03H 9/02039 |

FOREIGN PATENT DOCUMENTS

| | | |
|---|---|---|
| CN | 113014747 | 6/2021 |
| CN | 213879945 | 8/2021 |
| KR | 1020070042508 | 4/2007 |
| KR | 1020200060118 | 5/2020 |
| KR | 1020210017269 | 2/2021 |
| KR | 1020210099822 | 8/2021 |
| KR | 1020220029310 | 3/2022 |

OTHER PUBLICATIONS

International Search Report dated Nov. 21, 2022 issued in counterpart application No. PCT/KR2022/012543, 6 pages.

* cited by examiner

METHOD FOR PROVIDING IMAGE AND ELECTRONIC DEVICE SUPPORTING THE SAME

CROSS-REFERENCE TO RELATED APPLICATIONS

This application is a Bypass Continuation Application of PCT International Application No. PCT/KR2022/012543, which was filed on Aug. 22, 2022, and claims priority to Korean Patent Application No. 10-2021-0110863, which was filed in the Korean Intellectual Property Office on Aug. 23, 2021, the entire content of each of which is incorporated herein by reference.

BACKGROUND

1. Field

The disclosure generally relates to a method for providing images and an electronic device supporting the same.

2. Description of the Related Art

There has been increasing user demand for electronic devices capable of providing wider screens and improved aesthetic appearances while being compact. In order to satisfy such user demand, electronic devices have been developed which have a notch, U-type hole, V-type hole, or O-type hole formed on a part of a housing (or part of a display), and include a camera module exposed to the outside through the formed notch or hole.

Recently, under display camera (UDC) technology has been applied to electronic devices, in order to implement a full screen, such that a camera is disposed under a display.

An electronic device implemented using UDC technology has an opaque element (for example, a substrate made of polyimide) included in a display, and the transmittance of light introduced into the camera through the display may be lower than the transmittance of light introduced into the camera through a hole (for example, a U-type hole, a V-type hole, or an O-type hole).

In addition, in the case of an electronic device implemented using UDC technology, the color and/or brightness of images acquired through the camera may vary depending on the display and/or camera. For example, in the case of an electronic device implemented using UDC technology, the color and/or brightness of images acquired through the camera may vary depending on characteristics of the display (for example, optical transmittance of light in each wavelength resulting from components of display) and characteristics of the camera (for example, optical transmittance of light in each wavelength of image sensor).

SUMMARY

Various embodiments of the disclosure relate to a method for providing images and an electronic device supporting the same, wherein values for calibration regarding a display and a camera, respectively, to be included in an electronic device implemented using UDC technology are stored before the electronic device is manufactured (for example, assembled), and images acquired through the camera are corrected based on the values for calibration after the electronic device is manufactured, thereby making it unnecessary to perform separate calibration regarding the display and the camera after the electronic device is manufactured (or when the display and/or camera are replaced).

An electronic device according to an embodiment includes a display, a camera configured to acquire an image using light introduced through the display, and at least one processor configured to be electrically connected to the display and the camera, wherein the at least one processor is configured to acquire the image through the camera, acquire a first adjustment value for correcting the image, the first adjustment value corresponding to the display, acquire a second adjustment value for correcting the image, the second adjustment value corresponding to the camera and for correcting the image, and correct the image, based on the first adjustment value and the second adjustment value.

A method of providing an image in an electronic device according to an embodiment includes acquiring the image through a camera that acquires an image using light introduced through a display of the electronic device, acquiring a first adjustment value for correcting the image, the first adjustment value corresponding to the display, acquiring a second adjustment value for correcting the image, the second adjustment value corresponding to the camera, and correcting the image, based on the first adjustment value and the second adjustment value.

A method for providing images and an electronic device supporting the same, according to various embodiments of the disclosure, are advantageous in that values for calibration regarding a display and a camera, respectively, to be included in an electronic device implemented using UDC technology are stored before the electronic device is manufactured (for example, assembled), and images acquired through the camera are corrected based on the values for calibration after the electronic device is manufactured, thereby making it unnecessary to perform separate calibration regarding the display and the camera after the electronic device is manufactured (or when the display and/or camera are replaced).

BRIEF DESCRIPTION OF THE DRAWINGS

The above and other aspects, features, and advantages of certain embodiments of the disclosure will be more apparent from the following description taken in conjunction with the accompanying drawings, in which.

DETAILED DESCRIPTION

Figure 1:
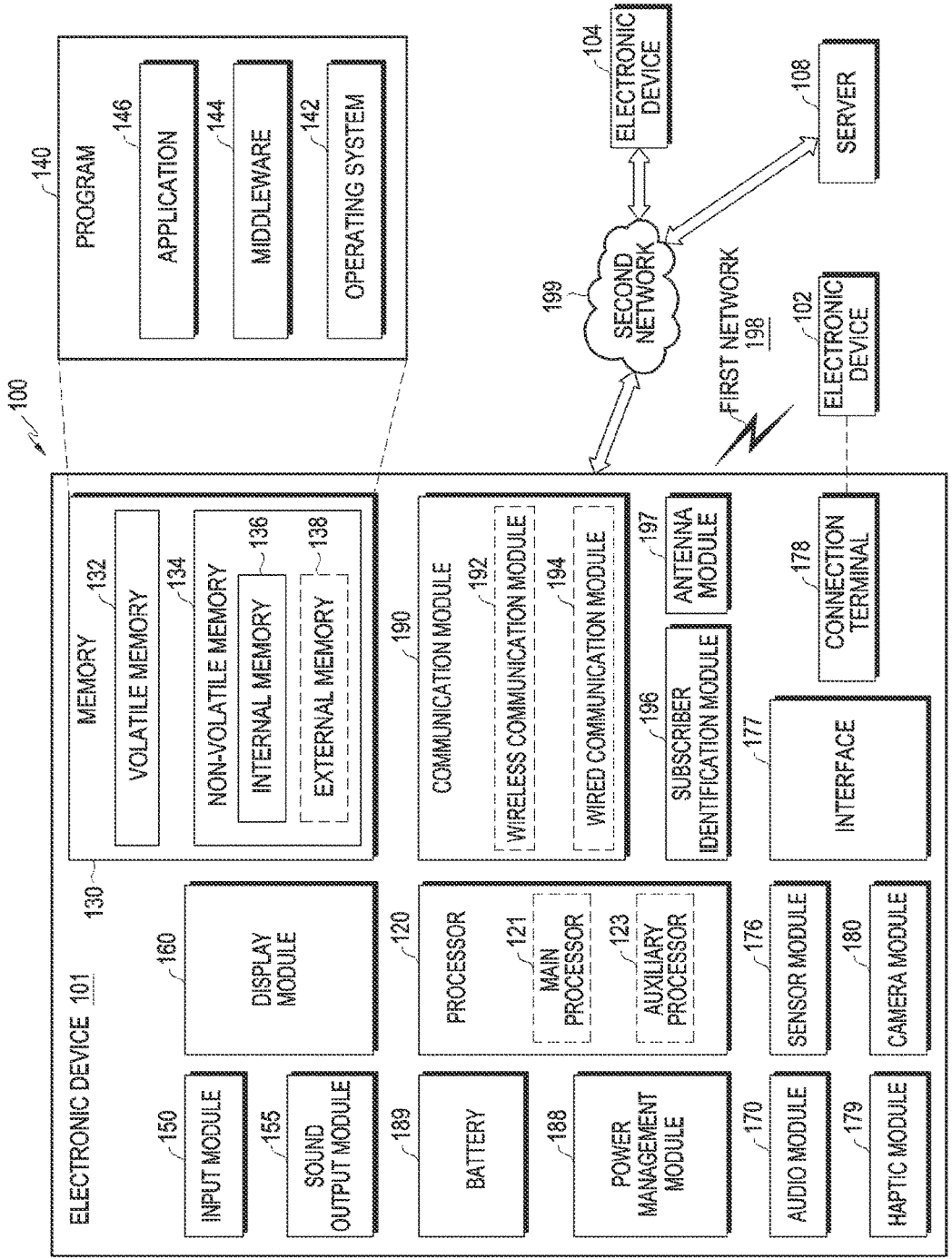
FIG. 1 is a block diagram illustrating an electronic device in a network environment according to an embodiment.

FIG. 1 is a block diagram illustrating an electronic, device 101 in a network environment 100 according to an embodiment.

Referring to FIG. 1, the electronic device 101 in the network environment 100 may communicate with an electronic device 102 via a first network 198 (e.g., a short-range wireless communication network), or at least one of an electronic device 104 or a server 108 via a second network 199 (e.g., a long-range wireless communication network). According to an embodiment, the electronic device 101 may communicate with the electronic device 104 via the server 108. According to an embodiment, the electronic device 101 may include a processor 120, memory 130, an input module 150, a sound output module 155, a display module 160, an audio module 170, a sensor module 176, an interface 177, a connecting terminal 178, a haptic module 179, a camera module 180, a power management module 188, a battery 189, a communication module 190, a subscriber identification module (SIM) 196, or an antenna module 197. In some embodiments, at least one of the components (e.g., the connecting terminal 178) may be omitted from the electronic device 101, or one or more other components may be added in the electronic device 101. In some embodiments, some of the components (e.g., the sensor module 176, the camera module 180, or the antenna module 197) may be implemented as a single component (e.g., the display module 160).

The processor 120 may execute, for example, software (e.g., a program 140) to control at least one other component (e.g., a hardware or software component) of the electronic device 101 coupled with the processor 120, and may perform various data processing or computation. According to one embodiment, as at least part of the data processing or computation, the processor 120 may store a command or data received from another component (e.g., the sensor module 176 or the communication module 190) in volatile memory 132, process the command or the data stored in the volatile memory 132, and store resulting data in non-volatile memory 134. According to an embodiment, the processor 120 may include a main processor 121 (e.g., a central processing unit (CPU) or an application processor (AP)), or an auxiliary processor 123 (e.g., a graphics processing unit (GPU), a neural processing unit (NPU), an image signal processor (ISP), a sensor hub processor, or a communication processor (CP)) that is operable independently from, or in conjunction with, the main processor 121. For example, when the electronic device 101 includes the main processor 121 and the auxiliary processor 123, the auxiliary processor 123 may be adapted to consume less power than the main processor 121, or to be specific to a specified function. The auxiliary processor 123 may be implemented as separate from, or as part of the main processor 121.

The auxiliary processor 123 may control, for example, at least some of functions or states related to at least one component (e.g., the display module 160, the sensor module 176, or the communication module 190) among the components of the electronic device 101, instead of the main processor 121 while the main processor 121 is in an inactive (e.g., sleep) state, or together with the main processor 121 while the main processor 121 is in an active (e.g., executing an application) state. According to an embodiment, the auxiliary processor 123 (e.g., an image signal processor or a communication processor) may be implemented as part of another component (e.g., the camera module 180 or the communication module 190) functionally related to the auxiliary processor 123. According to an embodiment, the auxiliary processor 123 e.g., the neural processing unit) may include a hardware structure specified for artificial intelligence model processing. An artificial intelligence model may be generated by machine learning Such learning may be performed, e.g., by the electronic device 101 where the artificial intelligence model is performed or via a separate server (e.g., the server 108). Learning algorithms may include, but are not limited to, e.g., supervised learning, unsupervised learning, semi-supervised learning, or reinforcement learning. The artificial intelligence model may include a plurality of artificial neural network layers. The artificial neural network may be a deep neural network (DNN), a convolutional neural network (CNN), a recurrent neural network (RNN), a restricted Boltzmann machine (RBM), a deep belief network (DBN), a bidirectional recurrent DNN (BRDNN), deep Q-network or a combination of two or more thereof but is not limited thereto. The artificial intelligence model may, additionally or alternatively, include a software structure other than the hardware structure.

The memory 130 may store various data used by at least one component (e.g., the processor 120 or the sensor module 176) of the electronic device 101. The various data may include, for example, software (e.g., the program 140) and input data or output data for a command related thereto. The memory 130 may include the volatile memory 132 or the non-volatile memory 134.

The program 140 may be stored in the memory 130 as software, and may include, for example, an operating system (OS) 142, middleware 144, or an application 146.

The input module 150 may receive a command or data to be used by another component (e.g., the processor 120) of the electronic device 101, from the outside (e.g., a user) of the electronic device 101. The input module 150 may include, for example, a microphone, a mouse, a keyboard, a key (e.g., a button), or a digital pen (e.g., a stylus pen).

The sound output module 155 may output sound signals to the outside of the electronic device 101. The sound output module 155 may include, for example, a speaker or a receiver. The speaker may be used for general purposes, such as playing multimedia or playing record. The receiver may be used for receiving incoming calls. According to an embodiment, the receiver may be implemented as separate from, or as part of the speaker.

The display module 160 may visually provide information to the outside (e.g., a user) of the electronic device 101. The display module 160 may include, for example, a display, a hologram device, or a projector and control circuitry to control a corresponding one of the display, hologram device, and projector. According to an embodiment, the display module 160 may include a touch sensor adapted to detect a touch, or a pressure sensor adapted to measure the intensity of force incurred by the touch.

The audio module 170 may convert a sound into an electrical signal and vice versa. According to an embodiment, the audio module 170 may obtain the sound via the input module 150, or output the sound via the sound output module 155 or an external electronic device (e.g., an electronic device 102 (e.g., a speaker or a headphone)) directly or wirelessly coupled with the electronic device 101.

The sensor module 176 may detect an operational state (e.g., power or temperature) of the electronic device 101 or an environmental state (e.g., a state of a user) external to the electronic device 101, and then generate an electrical signal or data value corresponding to the detected state. According to an embodiment, the sensor module 176 may include, for example, a gesture sensor, a gyro sensor, an atmospheric pressure sensor, a magnetic sensor, an acceleration sensor, a grip sensor, a proximity sensor, a color sensor, an infrared (IR) sensor, a biometric sensor, a temperature sensor, a humidity sensor, or an illuminance sensor.

The interface 177 may support one or more specified protocols to be used for the electronic device 101 to be coupled with the external electronic device (e.g., the electronic device 102) directly or wirelessly. According to an embodiment, the interface 177 may include, for example, a high definition multimedia interface (HDMI), a universal serial bus (USB) interface, a secure digital (SD) card interface, or an audio interface.

A connecting terminal 178 may include a connector via which the electronic device 101 may be physically connected with the external electronic device (e.g., the electronic device 102). According to an embodiment, the connecting terminal 178 may include, for example, an HDMI connector, a USB connector, an SD card connector, or an audio connector (e.g., a headphone connector).

The haptic module 179 may convert an electrical signal into a mechanical stimulus (e.g., a vibration or a movement) or electrical stimulus which may be recognized by a user via his tactile sensation or kinesthetic sensation. According to an embodiment, the haptic module 179 may include, for example, a motor, a piezoelectric element, or an electric stimulator.

The camera module 180 may capture a still image or moving images. According to an embodiment, the camera module 180 may include one or more lenses, image sensors, image signal processors, or flashes.

The power management module 188 may manage power supplied to the electronic device 101. According to one embodiment, the power management module 188 may be implemented as at least part of, for example, a power management integrated circuit (PMIC).

The battery 189 may supply power to at least one component of the electronic device 101. According to an embodiment, the battery 189 may include, for example, a primary cell which is not rechargeable, a secondary cell which is rechargeable, or a fuel cell.

The communication module 190 may support establishing a direct (e.g., wired) communication channel or a wireless communication channel between the electronic device 101 and the external electronic device (e.g., the electronic device 102, the electronic device 104, or the server 108) and performing communication via the established communication channel. The communication module 190 may include one or more communication processors that are operable independently from the processor 120 (e.g., the application processor (AP)) and supports a direct (e.g., wired) communication or a wireless communication. According to an embodiment, the communication module 190 may include a wireless communication module 192 (e.g., a cellular communication module, a short-range wireless communication module, or a global navigation satellite system (GNSS) communication module) or a wired communication module 194 (e.g., a local area network (LAN) communication module or a power line communication (PLC) module). A corresponding one of these communication modules may communicate with the external electronic device 104 via the first network 198 (e.g., a short-range communication network, such as Bluetooth™, wireless-fidelity (Wi-Fi) direct, or infrared data association (IrDA)) or the second network 199 (e.g., a long-range communication network, such as a legacy cellular network, a 5G network, a next-generation communication network, the Internet, or a computer network (e.g., LAN or wide area network (WAN)). These various types of communication modules may be implemented as a single component (e.g., a single chip), or may be implemented as multi components multi chips) separate from each other. The wireless communication module 192 may identify or authenticate the electronic device 101 in a communication network, such as the first network 198 or the second network 199, using subscriber information (e.g., international mobile subscriber identity (IMSI)) stored in the subscriber identification module 196.

The wireless communication module 192 may support a 5G network, after a 4G network, and next-generation communication technology, e.g., new radio (NR) access technology. The NR access technology may support enhanced mobile broadband (eMBB), massive machine type communications (mMTC), or ultra-reliable and low-latency communications (URLLC). The wireless communication module 192 may support a high-frequency band (e.g., the mmWave band) to achieve, e.g., a high data transmission rate. The wireless communication module 192 may support various technologies for securing performance on a high-frequency band, such as, e.g., beamforming, massive multiple-input and multiple-output (massive MIMO), full dimensional MIMO (FD-MIMO), array antenna, analog beam-forming, or large scale antenna. The wireless communication module 192 may support various requirements specified in the electronic device 101, an external electronic device the electronic device 104), or a network system (e.g., the second network 199). According to an embodiment, the wireless communication module 192 may support a peak data rate (e.g., 20 Gbps or more) for implementing eMBB, loss coverage (e.g., 164 dB or less) for implementing mMTC, or U-plane latency (e.g., 0.5 ms or less for each of downlink (DL) and uplink (UL), or a round trip of 1 ms or less) for implementing URLLC.

The antenna module 197 may transmit or receive a signal or power to or from the outside (e.g., the external electronic device) of the electronic device 101. According to an embodiment, the antenna module 197 may include an antenna including a radiating element composed of a conductive material or a conductive pattern formed in or on a substrate (e.g., a printed circuit board (PCB)). According to an embodiment, the antenna module 197 may include a plurality of antennas array antennas). In such a case, at least one antenna appropriate for a communication scheme used in the communication network, such as the first network 198 or the second network 199, may be selected, for example, by the communication module 190 from the plurality of antennas. The signal or the power may then be transmitted or received between the communication module 190 and the external electronic device via the selected at least one antenna. According to an embodiment, another component (e.g., a radio frequency integrated circuit (RFIC)) other than the radiating element may be additionally formed as part of the antenna module 197.

According to various embodiments, the antenna module 197 may form a mmWave antenna module. According to an embodiment, the mmWave antenna module may include a printed circuit board, an RFIC disposed on a first surface (e.g., the bottom surface) of the printed circuit board, or adjacent to the first surface and capable of supporting a designated high-frequency band (e.g., the mmWave band), and a plurality of antennas (e.g., array antennas) disposed on a second surface (e.g., the top or a side surface) of the printed circuit board, or adjacent to the second surface and capable of transmitting or receiving signals of the designated high-frequency band.

At least some of the above-described components may be coupled mutually and communicate signals (e.g., commands or data) therebetween via an inter-peripheral communication scheme (e.g., a bus, general purpose input and output (GPIO), serial peripheral interface (SPI), or mobile industry processor interface (MIPI)).

According to an embodiment, commands or data may be transmitted or received between the electronic device 101 and the external electronic device 104 via the server 108 coupled with the second network 199. Each of the external electronic devices 102 or 104 may be a device of a same type as, or a different type, from the electronic device 101. According to an embodiment, all or some of operations to be executed at the electronic device 101 may be executed at one or more of the external electronic devices 102, 104, or 108. For example, if the electronic device 101 should perform a function or a service automatically, or in response to a request from a user or another device, the electronic device 101, instead of, or in addition to, executing the function or the service, may request the one or more external electronic devices to perform at least part of the function or the service. The one or more external electronic devices receiving the request may perform the at least part of the function or the service requested, or an additional function or an additional service related to the request, and transfer an outcome of the performing to the electronic device 101. The electronic device 101 may provide the outcome, with or without further processing of the outcome, as at least part of a reply to the request. To that end, a cloud computing, distributed computing, mobile edge computing (MEC), or client-server computing technology may be used, for example. The electronic device 101 may provide ultra low-latency services using, e.g., distributed computing or MEC. In another embodiment, the external electronic device 104 may include an Internet-of-things (IoT) device. The server 108 may be an intelligent server using machine learning and/or a neural network. According to an embodiment, the external electronic device 104 or the server 108 may be included in the second network 199. The electronic device 101 may be applied to intelligent services (e.g., smart home, smart city, smart car, or healthcare) based on 5G communication technology or IoT-related technology.

The electronic device according to various embodiments may be one of various types of electronic devices. The electronic devices may include, for example, a portable communication device (e.g., a smartphone), a computer device, a portable multimedia device, a portable medical device, a camera, a wearable device, or a home appliance. According to an embodiment of the disclosure, the electronic devices are not limited to those described above.

It should be appreciated that various embodiments of the disclosure and the terms used therein are not intended to limit the technological features set forth herein to particular embodiments and include various changes, equivalents, or replacements for a corresponding embodiment. With regard to the description of the drawings, similar reference numerals may be used to refer to similar or related elements. It is to be understood that a singular form of a noun corresponding to an item may include one or more of the things, unless the relevant context clearly indicates otherwise. As used herein, each of such phrases as "A or B", "at least one of A and B", "at least one of A or B", "A, B, or C", "at least one of A, B, and C", and "at least one of A, B, or C" may include any one of, or all possible combinations of the items enumerated together in a corresponding one of the phrases. As used herein, such terms as "1st" and "2nd", or "first" and "second" may be used to simply distinguish a corresponding component from another, and does not limit the components in other aspect (e.g., importance or order). It is to be understood that if an element (e.g., a first element) is referred to, with or without the term "operatively" or "communicatively", as "coupled with", "coupled to", "connected with", or "connected to" another element (e.g., a second element), it means that the element may be coupled with the other element directly (e.g., wiredly), wirelessly, or via a third element.

As used in connection with various embodiments of the disclosure, the term "module" may include a unit implemented in hardware, software, or firmware, and may interchangeably be used with other terms, for example, "logic", "logic block", "part", or "circuitry". A module may be a single integral component, or a minimum unit or part thereof, adapted to perform one or more functions. For example, according to an embodiment, the module may be implemented in a form of an application-specific integrated circuit (ASIC).

Various embodiments as set forth herein may be implemented as software (e.g., the program 110) including one or more instructions that are stored in a storage medium (e.g., internal memory 136 or external memory 138) that is readable by a machine (e.g., the electronic device 101). For example, a processor (e.g., the processor 120) of the machine (e.g., the electronic device 101) may invoke at least one of the one or more instructions stored in the storage medium, and execute it. This allows the machine to be operated to perform at least one function according to the at least one instruction invoked. The one or more instructions may include a code generated by a complier or a code executable by an interpreter. The machine-readable storage medium may be provided in the form of a non-transitory storage medium. Wherein, the term "non-transitory" simply means that the storage medium is a tangible device, and does not include a signal (e.g., an electromagnetic wave), but this term does not differentiate between where data is semi-permanently stored in the storage medium and where the data is temporarily stored in the storage medium.

A method according to various embodiments of the disclosure may be included and provided in a computer program product. The computer program product may be traded as a product between a seller and a buyer. The computer program product may be distributed in the form of a machine-readable storage medium (e.g., compact disc read only memory (CD-ROM)), or be distributed (e.g., downloaded or uploaded) online via an application store (e.g., PlayStore™) or between two user devices (e.g., smart phones) directly. If distributed online, at least part of the computer program product may be temporarily generated or at least temporarily stored in the machine-readable storage medium, such as memory of the manufacturer's server, a server of the application store, or a relay server.

According to various embodiments, each component (e.g., a module or a program) of the above-described components may include a single entity or multiple entities, and some of the multiple entities may be separately disposed in different components. According to various embodiments, one or more of the above-described components or operations may be omitted, or one or more other components or operations may be added. Alternatively or additionally, a plurality of components (e.g., modules or programs) may be integrated into a single component. In such a case, the integrated component may still perform one or more functions of each of the plurality of components in the same or similar manner as they are performed by a corresponding one of the plurality of components before the integration. According to various embodiments, operations performed by the module, the program, or another component may be carried out sequentially, in parallel, repeatedly, or heuristically, or one or more of the operations may be executed in a different order or omitted, or one or more other operations may be added.

Figure 2:
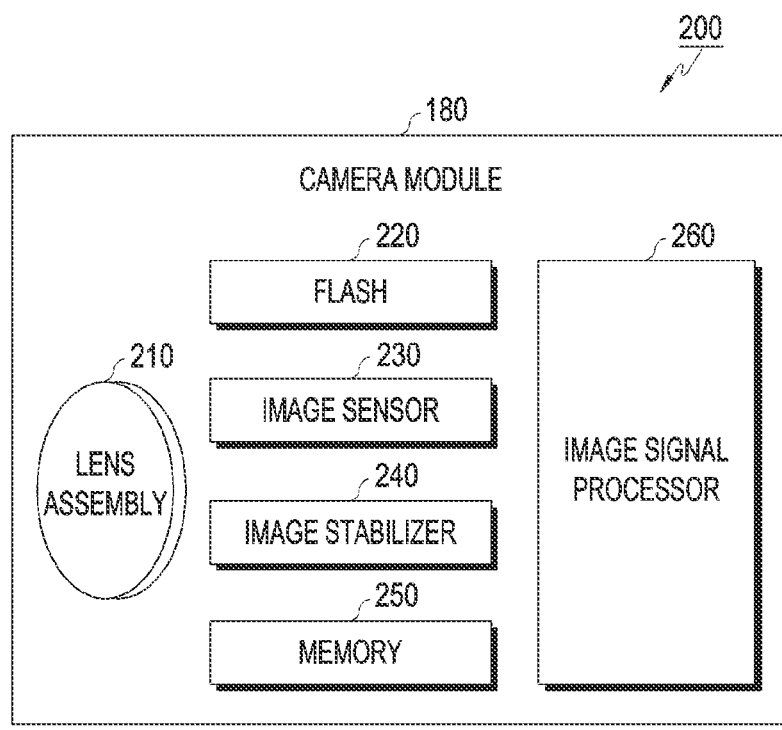
FIG. 2 is a block diagram illustrating a camera module according to an embodiment.

FIG. 2 is a block diagram 200 illustrating the camera module 180 according to an embodiment.

Referring to FIG. 2, the camera module 180 may include a lens assembly 210, a flash 220, an image sensor 230, an image stabilizer 240, memory 250 (e.g., buffer memory), and/or an ISP 260.

The lens assembly 210 may collect light emitted or reflected from an object whose image is to be taken. The lens assembly 210 may include one or more lenses. According to an embodiment, the camera module 180 may include a plurality of lens assemblies 210. In such a case, the camera module 180 may form, for example, a dual camera, a 360-degree camera, or a spherical camera. Some of the plurality of lens assemblies 210 may have the same lens attribute (e.g., view angle, focal length, auto-focusing, f number, or optical zoom), or at least one lens assembly may have one or more lens attributes different from those of another lens assembly. The lens assembly 210 may include, for example, a wide-angle lens or a telephoto lens.

The flash 220 may emit light that is used to reinforce light reflected from an object. According to an embodiment, the flash 220 may include one or more light emitting diodes (LEDs) (e.g., a red-green-blue (RGB) LED, a white LED, an infrared (IR) LED, or an ultraviolet (UV) LED) or a xenon lamp. The image sensor 230 may obtain an image corresponding to an object by converting light emitted or reflected from the object and transmitted via the lens assembly 210 into an electrical signal.

According to an embodiment, the image sensor 230 may include one selected from image sensors having different attributes, such as a RGB sensor, a black-and-white (BW) sensor, an IR sensor, or a UV sensor, a plurality of image sensors having the same attribute, or a plurality of image sensors having different attributes. Each image sensor included in the image sensor 230 may be implemented using, for example, a charged coupled device (CCD) sensor or a complementary metal oxide semiconductor (CMOS) sensor.

The image stabilizer 240 may move the image sensor 230 or at least one lens included in the lens assembly 210 in a particular direction, or control an operational attribute (e.g., adjust the read-out timing) of the image sensor 230 in response to the movement of the camera module 180 or the electronic device 101 including the camera module 180. This allows compensating for at least part of a negative effect (e.g., image blurring) by the movement on an image being captured. According to an embodiment, the image stabilizer 240 may sense such a movement by the camera module 180 or the electronic device 101 using a gyro sensor (not shown) or an acceleration sensor (not shown) disposed inside or outside the camera module 180. According to an embodiment, the image stabilizer 240 may be implemented, for example, as an optical image stabilizer.

The memory 250 may store, at least temporarily, at least part of an image obtained via the image sensor 230 for a subsequent image processing task. For example, if image capturing is delayed due to shutter lag or multiple images are quickly captured, a raw image obtained (e.g., a Bayer-patterned image, a high-resolution image) may be stored in the memory 250, and its corresponding copy image (e.g., a low-resolution image) may be previewed via the display module 160. Thereafter, if a specified condition is met (e.g., by a user's input or system command), at least part of the raw image stored in the memory 250 may be obtained and processed, for example, by the image signal processor 260. According to an embodiment, the memory 250 may be configured as at least part of the memory 130 or as a separate memory that is operated independently from the memory 130.

The image signal processor 260 may perform one or more image processing with respect to an image obtained via the image sensor 230 or an image stored in the memory 250. The one or more image processing may include, for example, depth map generation, three-dimensional (3D) modeling, panorama generation, feature point extraction, image synthesizing, or image compensation (e.g., noise reduction, resolution adjustment, brightness adjustment, blurring, sharpening, or softening) Additionally or alternatively, the image signal processor 260 may perform control (e.g., exposure time control or read-out timing control) with respect to at least one (e.g., the image sensor 230) of the components included in the camera module 180. An image processed by the image signal processor 260 may be stored back in the memory 250 for further processing, or may be provided to an external component (e.g., the memory 130, the display module 160, the electronic device 102, the electronic device 104, or the server 108) outside the camera module 180. According to an embodiment, the image signal processor 260 may be configured as at least part of the processor 120, or as a separate processor that is operated independently from the processor 120. If the image signal processor 260 is configured as a separate processor from the processor 120, at least one image processed by the image signal processor 260 may be displayed, by the processor 120, via the display module 160 as it is or after being further processed.

According to an embodiment, the electronic device 101 may include a plurality of camera modules 180 having different attributes or functions. In such a case, at least one of the plurality of camera modules 180 may form, for example, a wide-angle camera and at least another of the plurality of camera modules 180 may form a telephoto camera. Similarly, at least one of the plurality of camera modules may form, for example, a front camera and at least another of the plurality of camera modules may form a rear camera.

Figure 3:
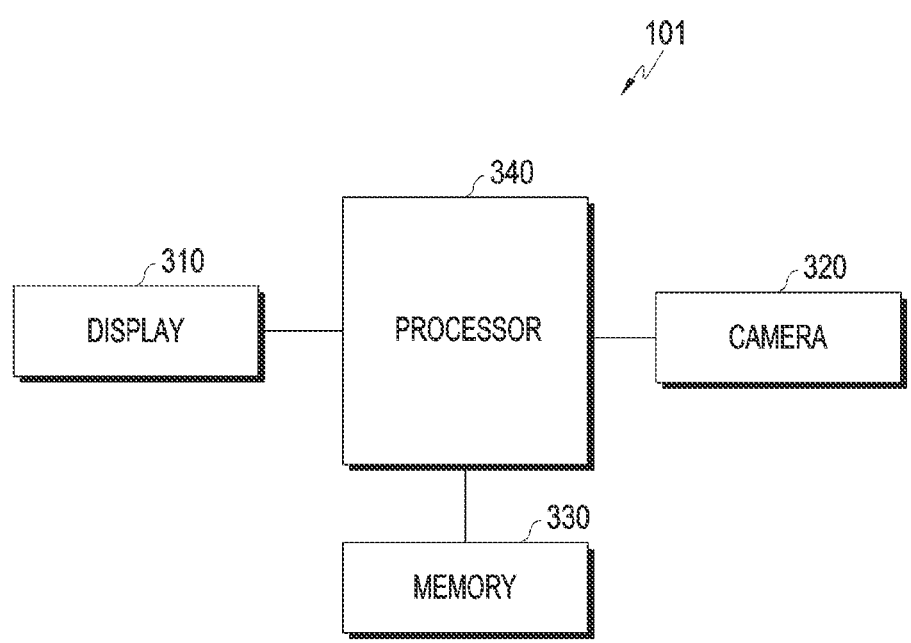
FIG. 3 is a block diagram illustrating an electronic device according to an embodiment.
Figure 4:
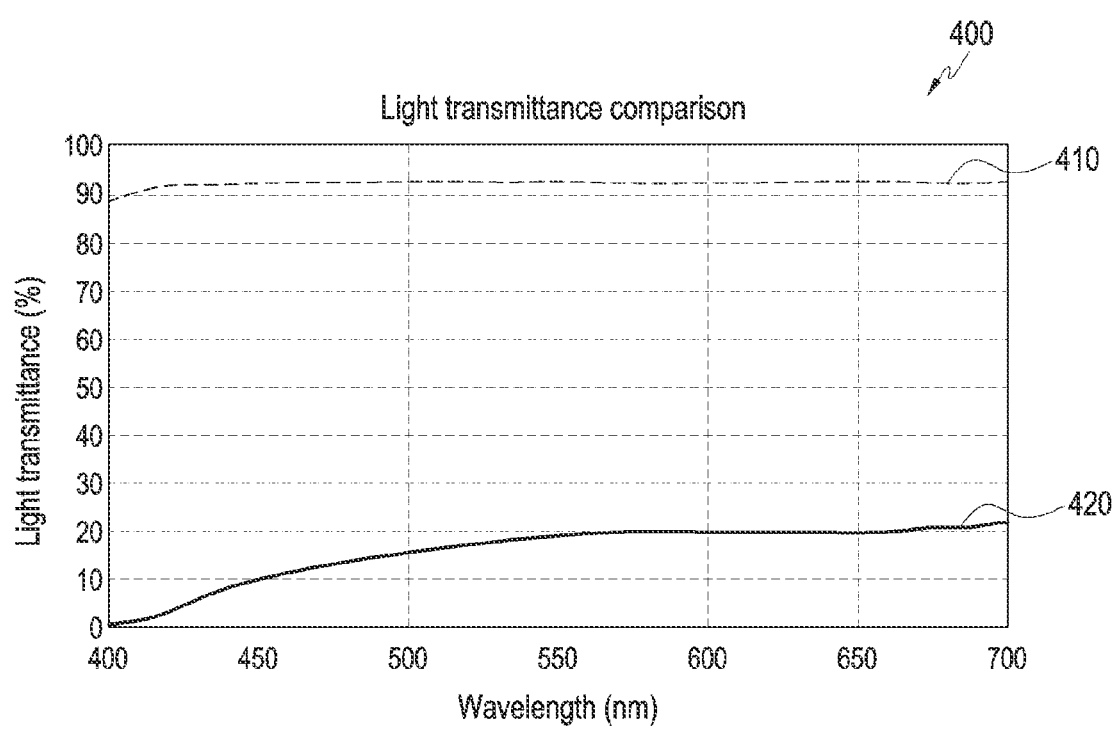
FIG. 4 illustrates a graph showing transmittance of light for each wavelength in a display according to an embodiment.

FIG. 3 is a block diagram illustrating an electronic device 101 according to an embodiment. FIG. 4 is a diagram 100 illustrating a graph showing light transmittance for each wavelength of light in a display 310 according to an embodiment.

Referring to FIGS. 3 and 4, the electronic device 101 may include the display 310, a camera 320, a memory 330, and/or a processor 340.

The display 310 may be included in the display module 160 of FIG. 1.

The display 310 may be a display for implementing an under display camera (UDC) technology. For example, the display 310 may include an area (hereinafter, referred to as a "UDC area") for allowing light from outside the electronic device 101 to pass through the display 310 and to enter the camera 320. The UDC area of the display 310 may be an area having a lower pixels per inch (PPI) than the PPI of other areas of the display 310.

The light transmittance of the display 310 (e.g., the UDC area) may be lower than light transmittance of a display according to the comparative example (e.g., a display in which a hole is provided on the front surface of the electronic device 101 so that light is introduced into the camera 320). For example, in FIG. 4, a line 410 may indicate the light transmittance of the display according to the comparative example, and a line 420 may indicate the light transmittance of the display 310. As illustrated in FIG. 4, the light transmittance of the display 310 may be lower than the light transmittance of the display according to the comparative example. As illustrated in the line 420 in FIG. 4, the transmittance of light passing through display 310 may vary according to a wavelength.

The transmittance of light passing through the display 310 (e.g., the UDC area) may vary according to characteristics of the display 310. For example, depending on differences and/or arrangement (arrangement spacing, relative position) between components included in the display 310, the transmittance of light passing through the display may vary for each of the displays.

The display 310 may include a memory for storing information related to the display. When the display 310 and the camera 320 are mounted in the electronic device 101 in a form in which the camera 320 is disposed below the display 310, the memory of the display 310 may store information (e.g., information for correcting an image) for compensating for the quality of an image acquired through the camera 320, which is deteriorated by the characteristics of the display 310. When the display 310 and the camera 320 are mounted in the electronic device 101 in the form in which the camera 320 is disposed below the display 310, the memory of the display 310 may store information for setting a camera setting that may be incorrectly set by the characteristics of the display. The information for correcting an image and the information for setting the camera setting will be described below, the information for correcting an image and the information for setting the camera being stored in the memory of the display 310.

The camera 320 may be included in the camera module 180 of FIGS. 1 and 2.

The camera 320 may be a camera that acquires an image using light that passes through the display 310 (e.g., the UDC area) and is disposed under the display 310.

The amount of light received by the image sensor of the camera 320 may vary according to characteristics of the camera 320. For example, depending on differences of components (e.g., color filter array, lens) included in the camera 320 and/or arrangement (e.g., arrangement spacing, relative position) between the components included in the camera 320, the amount of light received by each of the image sensors of the cameras may be different for each of the image sensors. As another example, the transmittance of light of the color filter array included in the camera 320 may vary according to the wavelength of the light. The light transmittance of the color filter array included in the camera 320 may be different for each camera.

The camera 320 may include a memory for storing information related to the camera. When the display 310 and the camera 320 are mounted in the electronic device 101 in a form in which the camera 320 is disposed below the display 310, the memory of the display 320 may store information (e.g., information for correcting an image) for compensating for the quality of an image acquired through the camera 320, which is deteriorated by the characteristics of the camera. When the display 310 and the camera 320 are mounted in the electronic device 101 in the form in which the camera 320 is disposed below the display 310, the memory of the camera 320 may store information for setting the camera setting that may be incorrectly set by the characteristics of the camera. The information for correcting an image and the information for setting the camera setting will be described below, the information for correcting an image and the information for setting the camera setting being stored in the memory of the display 310.

The memory 330 may be included in the memory 130 of FIG. 1.

The memory 330 may store a variety of information for performing an operation of providing an image.

The processor 340 may generally control an operation of providing an image. The processor 340 may include one or more processors that control the operation of providing an image. A method of controlling an operation for the processor 340 to provide an image will be described below with reference to FIGS. 7 and 8.

Although FIG. 3 illustrates that the electronic device 101 includes the display 310, the camera 320, the memory 330, and/or the processor 340, the disclosure is not limited thereto. For example, the electronic device 101 may further include at least one component (e.g., the communication module 180) among the components of the electronic device 101 illustrated in FIG. 1.

Hereinafter, through FIGS. 5A to 5C and FIG. 6, a method of storing information for correcting an image acquired through the camera 320 and/or information for setting a setting of the camera 320 by each of the display 310 (e.g., the memory of the display 310) and the camera 320 (e.g., the memory of the camera 320) will be described.

An electronic device according to an embodiment includes a display, a camera configured to acquire an image using light introduced through the display, and at least one processor configured to be electrically connected to the display and the camera, wherein the at least one processor may be configured to acquire the image through the camera, to acquire a first adjustment value for correcting the image, the first adjustment value corresponding to the display, to acquire a second adjustment value for correcting the image, the second adjustment value corresponding to the camera, and to correct the image based on the first adjustment value and the second adjustment value.

The at least one processor may be configured to acquire the first adjustment value from a memory of the display, and to acquire the second adjustment value from a memory of the camera.

The electronic device may further include a communication module, wherein the at least one processor may be configured to acquire the first adjustment value and the second adjustment value from a server through the communication module.

The at least one processor may be configured to correct the image by adjusting at least one of white balance, lens shading, or color correction matrix (CCM) of the image based on the first adjustment value and the second adjustment value.

The first adjustment value may be acquired based on an image acquired by a reference camera using light emitted from a light source and introduced through the display before the display is mounted in the electronic device.

The reference camera may be, among a plurality of cameras mountable to the electronic device, a camera having a characteristic value corresponding to an average of characteristic values of the plurality of cameras or a median value among the characteristic values of the plurality of cameras.

The second adjustment value may be acquired based on an image acquired by the camera by using light emitted from the light source before the camera 3 is mounted in the electronic device.

The first adjustment value may be, based on an image acquired by the reference camera, acquired by an adjustment device communicatively connected to the reference camera, and the second adjustment value may be, based on the image acquired, acquired by the adjustment device communicatively connected to the reference camera.

The at least one processor may be configured to acquire a third adjustment value for adjusting a camera setting, the third adjustment value corresponding to the display, to acquire a fourth adjustment value for adjusting the camera setting, the fourth adjustment value corresponding to the camera, and to set the camera setting, based on the third adjustment value and the fourth adjustment value.

The at least one processor may be configured to set the camera setting related to a position of a lens for auto focus and/or the camera setting for correcting an aberration of the lens, based on the third adjustment value and the fourth adjustment value.

Figure 5A:
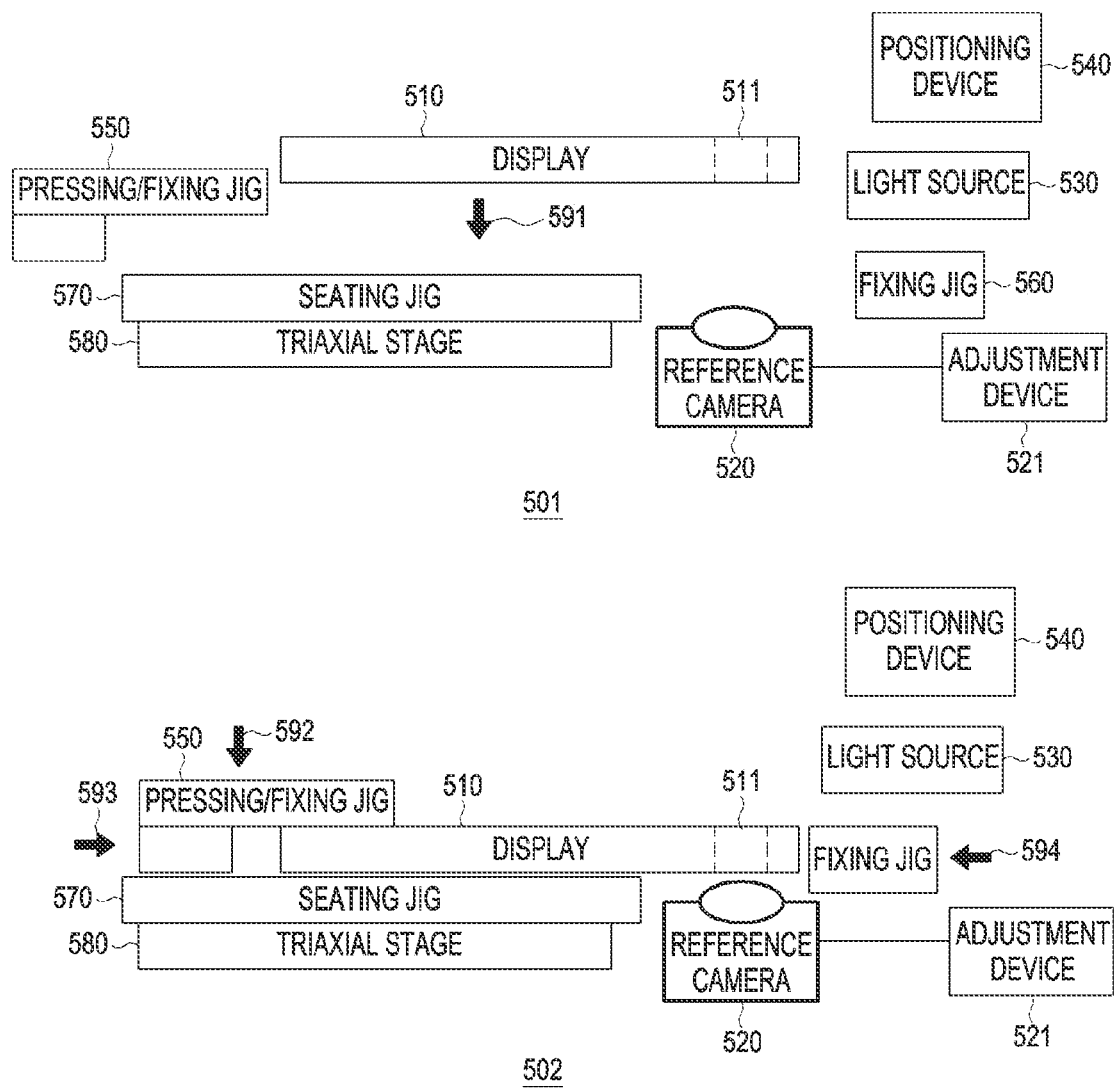
FIGS. 5A to 5C illustrate a method of acquiring information for image correction and information for camera setting with respect to a display according to an embodiment.
Figure 5B:
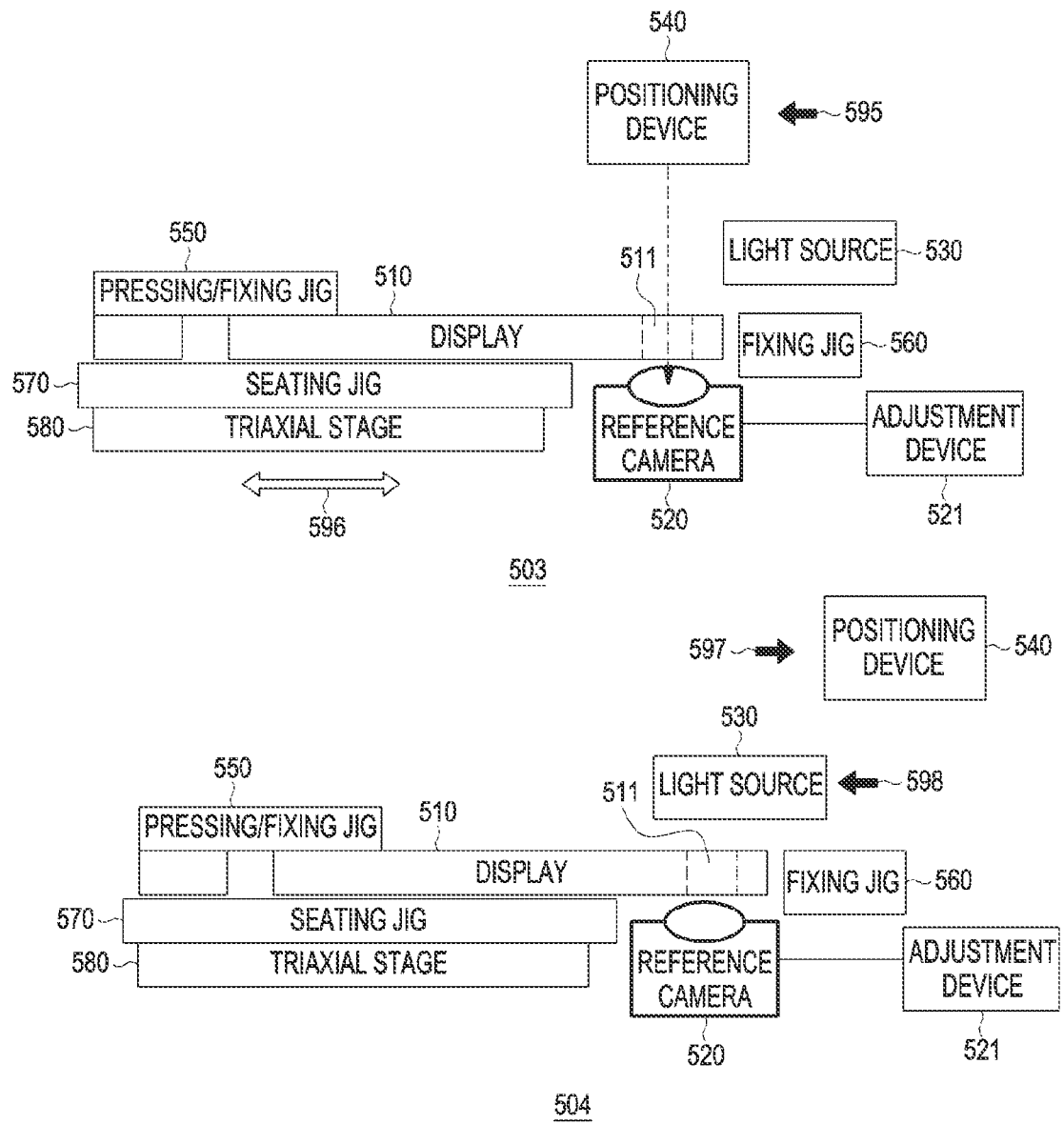
Figure 5C:
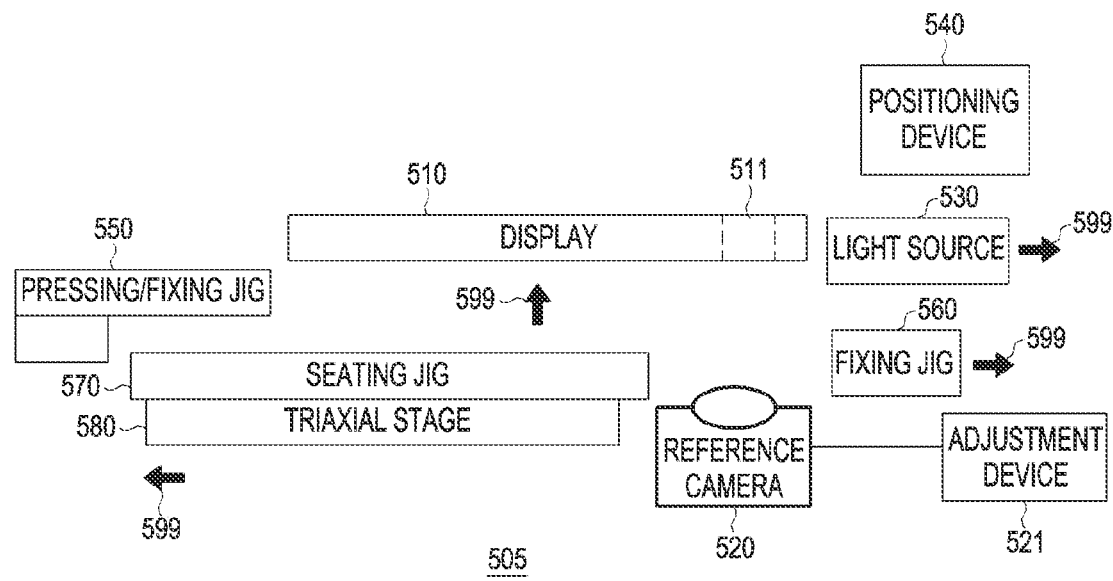

FIGS. 5A to 5C illustrate a method of acquiring information for image correction and information for camera setting with respect to a display according to an embodiment.

Referring to FIGS. 5A to 5C, a system for acquiring information for image correction and information for camera setting with respect to a display 510 may include the display 510, a reference camera 520, a light source 530, a positioning device 540, a pressing/fixing jig 550, a seating jig 570, a triaxial stage 580, a fixing jig 560, and/or an adjustment device 521.

The display 510 may be a display to be calibrated. The display 510 (e.g., the display 310) may be a display to be included in the electronic device 101 by UDC technology.

The reference camera 520 (also referred to as a "master camera") may be a camera having a designated characteristic value.

Among a plurality of cameras (e.g., a plurality of cameras including a specific image sensor and a specific lens) mountable to the electronic device 101, the reference camera 520 may be a camera having a characteristic value corresponding to an average of characteristic values of the plurality of cameras. For example, the reference camera may be a camera having a white balance value closest to an average of white balance values of the plurality of cameras. However, the disclosure is not limited thereto.

The reference camera 520 may be a camera having a median value among the characteristic values of the plurality of cameras among the plurality of cameras mountable to the electronic device 101.

The light source 530 (e.g., a standard light source) may be a light source having a designated color temperature (e.g., about 5100K (kelvin)). The color temperature of about 5100K may be a color temperature of a daylight environment. However, the color temperature of the light source 530 is not limited to about 5100K, and the light source 530 may have a different color temperature (e.g., about 6500K).

The positioning device 540 may be configured to align a UDC area 511 of the display 510 and the lens of the reference camera 520. The positioning device 540 may be a positioning device using a vision camera or a laser.

The seating jig 570 may be a jig on which the display 510 is seated, and may be moved by the triaxial stage 580. The pressing/fixing jig 550 and the fixing jig 560 may be configured to fix the display 510 while the display 510 is seated on the seating jig 570.

The adjustment device 521 may acquire an image of the light source 530 acquired by the reference camera 520, from the reference camera 520. The adjustment device 521 may acquire (e.g., generate) information for image correction related to the display 510 and information for camera setting, based on the acquired image. The adjustment device 521 may store the information for image correction related to the display 510 and the information for camera setting in the memory of the display 510.

Referring to FIG. 5A, reference numeral 501 may indicate an operation of seating the display 510 on the seating jig 570. For example, as shown by reference numeral 501, the display 510 may be seated on the seating jig 570 in a direction indicated by an arrow 591.

Reference numeral 502 may indicate an operation of fixing the display 510. For example, as shown by reference numeral 502, in a state in which the display 510 is seated on the seating jig 570, the display 510 may be fixed on the seating jig 570 as the pressing/fixing jig 550 and the fixing jig 560 move in directions indicated by arrows 592, 593, and 594.

Referring to FIG. 5B, reference numeral 503 may indicate an operation of aligning the UDC area 511 of the display 510 and the reference camera 520. For example, as shown by reference numeral 503, by moving the positioning device 540 in a direction indicated by the arrow 595 and moving the triaxial stage 580 in a direction indicated by the arrow 596, the positioning device 540 may align the UDC area 511 of the display 510 and the reference camera 520 so that center coordinates of the lens of the reference camera 520 may match center coordinates of the UDC area 511 of the display 510.

Reference numeral 504 may indicate an operation of obtaining information for image correction and information for camera setting related to the display based on an image of the light source 530. For example, as shown by reference numeral 504, the positioning device 540 may be moved in a direction indicated by an arrow 597 and the light source 530 may be moved in a direction indicated by an arrow 598 so that light emitted from the light source 530 may pass through the UDC area 511 of the display 510 and may be introduced into the reference camera 520.

The reference camera 520 may acquire the image of the light source 530 by using the light emitted from the light source 530 and passing through the UDC area 511 of the display 510 to be introduced into the reference camera 520. The reference camera 520 may transmit the acquired image of the light source 530 to the adjustment device 521 through a communication module (e.g., a wireless communication module or a wired communication module) of the reference camera 520.

The adjustment device 521 may acquire the information for image correction and information for camera setting related to the display 510 based on the image of the light source 530. The information for image correction related to the display 510 may include a value for adjusting white balance (e.g., a red, green, blue (RGB) ratio), a value for adjusting lens shading, and/or a value for adjusting a color correction matrix (CCM). The information for camera setting related to the display 510 may include a camera setting value related to a position of a lens for auto focus and/or a camera setting value for correcting an aberration of the lens. However, the values for image correction related to the display and the information for camera setting related to the display are not limited to the above-described examples.

In order for the adjustment device 521 to acquire the value for adjusting the white balance (e.g., the RGB ratio), the adjustment device 521 may extract a designated area (e.g., an area corresponding to a designated radius from the center of the image portion of the light source 530 within the image of the light source 530) with respect to the center of an image portion of the light source 530 within the image of the light source 530. The adjustment device 521 may obtain an RGB ratio (e.g., R/G and B/G) of the designated area as a value for adjusting white balance (e.g., the RGB ratio).

The adjustment device 521 may transmit the information for image correction and information for camera setting related to the display 510 to the display 510 through a wireless or wired communication module of the adjustment device 521. The display 510 may store the received information for image correction and information for camera setting related to the display 510 in the memory of the display 510.

In the above-described example, the adjustment device 521 is exemplified as transmitting the information for image correction and camera setting related to the display 510 to the display 510, but the disclosure is not limited thereto. For example, the adjustment device 521 may transmit, to a server, the information for image correction and information for camera setting related to the display 510 together with unique identification information (e.g., a serial number of the display 510) of the display 510. In this case, the information for image correction and information for camera setting related to the display 510 may be stored in a server in addition to or in place of being stored in the memory of the display 510.

Referring to FIG. 5C, reference numeral 505 may indicate an operation for replacing the display 510 with another display 510. For example, as shown by reference numeral 505, after the reference camera 520 acquires the image of the light source 530, the display 510, the light source 530, the fixing jig 560, the pressing/fixing jig 550, and the triaxial stage 580 may be moved as indicated by arrows 599. After moving the display 510, the light source 530, the fixing jig 560, the pressing/fixing jig 550, and the triaxial stage 580, operations shown in reference numerals 501 to 504 may be performed to acquire information for image correction and information for camera setting related to another display.

Figure 6:
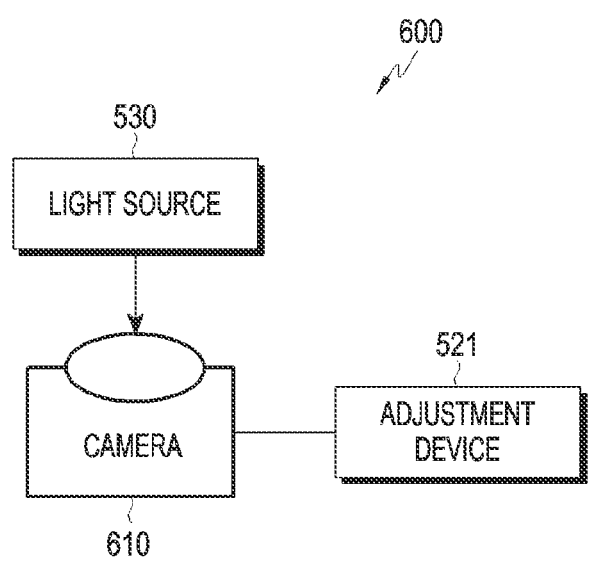
FIG. 6 illustrates a method of acquiring information for image correction and information for camera setting with respect to a camera according to an embodiment.

FIG. 6 illustrates a method 600 of acquiring information for image correction and information for camera setting with respect to a camera according to an embodiment.

Referring to FIG. 6, a system for acquiring information for image correction and information for camera setting related to a camera may include a camera 610, the adjustment device 521, and the light source 530.

The camera 610 may be a camera to be calibrated. The camera 610 may be a camera to be included in the electronic device 101 by UDC technology.

Since reference camera 610 has been described with reference to FIGS. 5A to 5C, the description of reference camera 610 will be omitted.

Since the light source 530 has been described with reference to FIGS. 5A to 5C, the description of the light source 530 will be omitted.

The camera 610 may acquire an image of the light source 530. The camera 610 may transmit the acquired image of the light source 530 to the adjustment device 521 through a wireless or wired communication module of the camera 610.

The adjustment device 521 may acquire the information for image correction and information for camera setting related to the camera based on the acquired image of the light source 530. The information for image correction related to the camera may include a value for adjusting white balance (e.g. an RGB ratio), a value for adjusting lens shading, and/or a value for adjusting a CCM. The information for camera setting related to the camera may include a camera setting value (e.g., information on a position of a lens set differently according to a distance between a subject and a camera for auto focus) related to a position of a lens for auto focus, and/or a camera setting value for correcting an aberration of the lens. However, the values for image correction related to the camera and information for camera setting related to the camera are not limited to the above-described examples.

In order for the adjustment device 521 to acquire the value for adjusting the white balance (e.g., the RGB ratio), the adjustment device 521 may extract a designated area (e.g., an area corresponding to a designated radius from the center of an image portion of the light source 530 within the image of the light source 530) with respect to the center of the image portion of the light source 530 within the image of the light source 530. The adjustment device 521 may obtain an RGB ratio (e.g., R/G and B/G) of the designated area as a value for adjusting white balance (e.g., the RGB ratio).

The adjustment device 521 may transmit the information for image correction and information for camera setting related to the camera to the camera 610 through a wireless or wired communication module of the adjustment device 521. The camera 610 may store the received information for image correction and information for camera setting related to the camera in the memory of the camera 610.

In the above-described example, the adjustment device 521 is exemplified as transmitting the information for image correction and information for camera setting related to the camera to the camera, but the disclosure is not limited thereto. For example, the adjustment device 521 may transmit the information for image correction and information for camera setting related to the camera to the camera to a server together with unique identification information of the camera 610 (e.g., a serial number of the camera 610). In this case, the information for image correction and information for camera setting related to the camera 610 may be stored in the server in addition to or in place of being stored in the memory of the camera 610.

In the memory of the camera 610, information for image correction and information for camera setting related to the reference camera 520 may be stored. For example, when the reference camera 520 is selected from among a plurality of cameras including a designated image sensor and a designated lens, the information for image correction and information for camera setting related to the reference camera 520 may be stored in the memory of each of the plurality of cameras. However, the disclosure is not limited thereto.

Figure 7:
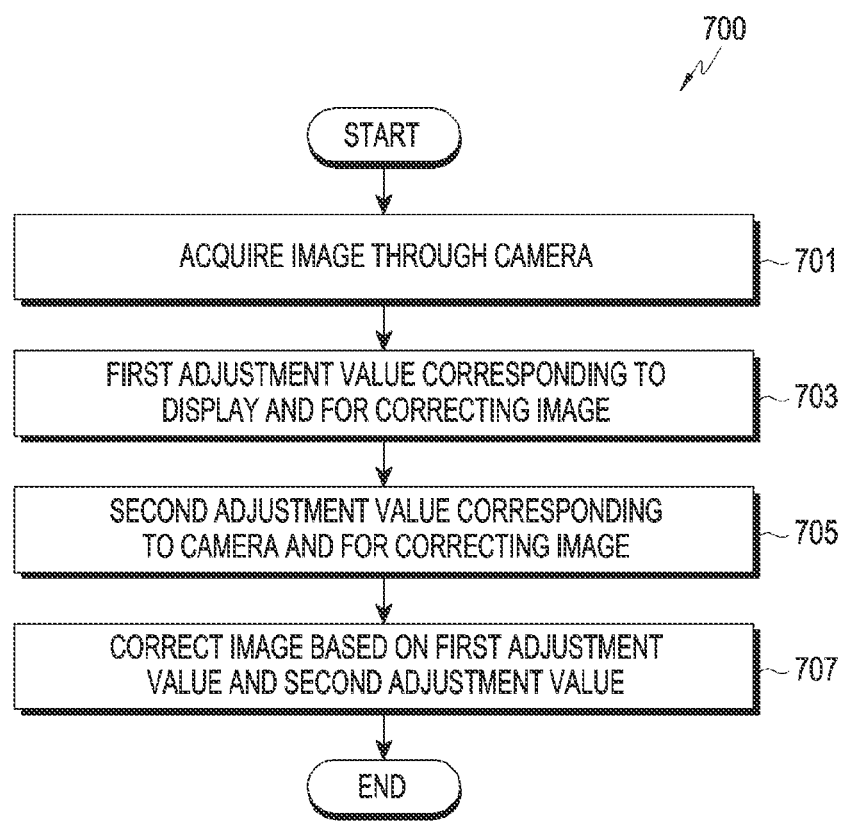
FIG. 7 is a flowchart illustrating a method of correcting an image according to an embodiment.

FIG. 7 illustrates a method 700 of correcting an image according to an embodiment.

Referring to FIG. 7, in operation 701, the processor 340 may acquire an image through the camera 320. For example, in a state in which the display 310 and the camera 320 that acquires an image using light introduced through the display 310 are mounted on the electronic device 101 the processor 340 may acquire an image through the camera 320.

In operation 703, the processor 340 may acquire a first adjustment value (hereinafter referred to as a "first adjustment value") corresponding to the display 310 and for correcting an image. For example, the processor 340 may acquire the information for correcting an image related to the display acquired through Operations of FIGS. 5A to 5C as the first adjustment value.

The processor 340 may acquire the first adjustment value from the memory of the display 310. However, the disclosure is not limited thereto. The processor 340 may acquire the first adjustment value from a server. For example, the processor 340 may identify unique identification information of the display 310. The processor 340 may request the first adjustment value corresponding to the unique identification information of the display 310 from the server through the communication module 180. The processor 340 may acquire the first adjustment value by receiving the first adjustment value corresponding to the unique identification information of the display 310 from the server through the communication module 180.

In operation 705, the processor 340 may acquire a second adjustment value (hereinafter referred to as a "second adjustment value") corresponding to the camera 320 and for correcting an image. For example, the processor 340 may acquire the information for correcting an image related to the camera obtained through the examples of FIG. 6 as the second adjustment value. However, the disclosure is not limited thereto. The processor 340 may acquire the second adjustment value from the server. For example, the processor 340 may identify unique identification information of the camera 320. The processor 340 may request the second adjustment value corresponding to the unique identification information of the camera 320 from the server through the communication module 180. The processor 340 may acquire the second adjustment value by receiving the second adjustment value corresponding to the unique identification information of the camera 320 from the server through the communication module 180.

In FIG. 7, acquiring the first adjustment value in operation 703 is exemplified as being performed before the acquiring of the second adjustment value in operation 705, but the disclosure is not limited thereto. For example, acquiring the second adjustment value in operation 705 may be performed before or simultaneously with (e.g., in parallel) acquiring the first adjustment value in operation 703.

In operation 707, the processor 340 may correct the image based on the first adjustment value and the second adjustment value. For example, the processor 340 may correct the image by adjusting white balance (e.g., an RGB ratio), lens shading, and CCM of the image based on the first adjustment value and the second adjustment value.

Table 1 below illustrates a method for the processor 340 to adjust the white balance of the image based on the first adjustment value and the second adjustment value.

TABLE 1

|  | RGB ratio | | |
|---|---|---|---|
| RGB ratio of reference camera | 1 | 1 | 1 |
| First adjustment value | 0.7 | 1 | 0.4 |
| Second adjustment value | 0.98 | 1 | 1.01 |
| Difference in RGB ratio between reference camera and camera | 0.02 | 0 | −0.01 |
| Difference between RGB ratio of reference camera and first adjustment value | 0.3 | 0 | 0.6 |

In Table 1, when the reference camera 520 acquires an image of a light source (e.g., a light source having a color temperature of 5100K), the RGB ratio of the reference camera 520 may be an RGB ratio obtained from the acquired image of the light source (e.g., an area corresponding to a designated radius from the center of the image portion of the light source within the image of the light source).

In Table 1, in reference numeral 504 described above with reference to FIG. 5B, the first adjustment value may be an RGB ratio obtained from the image of the light source, which is acquired using light emitted from the light source and introduced into the reference camera 520 through the display 310.

In Table 1, the second adjustment value may be an RGB ratio obtained from the acquired image of the light source when the camera acquires the image of the light source in FIG. 6 described above.

In Table 1, a difference in the RGB ratio between the reference camera 520 and the camera 320 may be a difference between the RGB ratio of the reference camera 520 of Table 1 and the second adjustment value.

The processor 340 may adjust white balance of the image based on the RGB ratio of the reference camera 520, the difference between the reference camera 520 and the second adjustment value (the RGB ratio of the camera 320), and the difference between the RGB ratio of the reference camera 520 and the first adjustment value. For example, as shown in Table 1, when the RGB ratio of the reference camera 520 is (1, 1, 1) (e.g., when the RGB ratio of the reference camera 520 is 1:1:1) and when the first adjustment value is (0.7, 1, 0.4) and the second adjustment value is (0.98, 1, 1.01), a difference between the reference camera 520 and the second adjustment value may be (0.02, 0, −0.01) and a difference between the reference camera 520 and the first adjustment value may be (0.3, 0, 0.6). The processor 340 may obtain a gain (1/(1−(0.3+0.02)) for adjusting R/G of the image and a gain (1/(1−(0.6−0.01)) for adjusting R/G of the image. When an image having a color temperature of 5100K is acquired through the camera 320, the processor 340 may adjust the white balance of the image by multiplying the R/G of the acquired image by the gain (e.g. 1/(1−(0.3+0.02)) for adjusting the R/G and multiplying the B/G of the acquired image by the gain (e.g. 1/(1−(0.6−0.01)) for adjusting the B/G, so that the RGB ratio of the acquired image may be the RGB ratio of the reference camera 520 (e.g., an RGB ratio of 1:1:1). However, the example in which the processor 340 corrects the image based on the first adjustment value and the second adjustment value is not limited to the above-described example. The processor 340 may correct the image by adjusting lens shading and/or CCM of the image, similar to the example of adjusting the white balance of the image.

Figure 8:
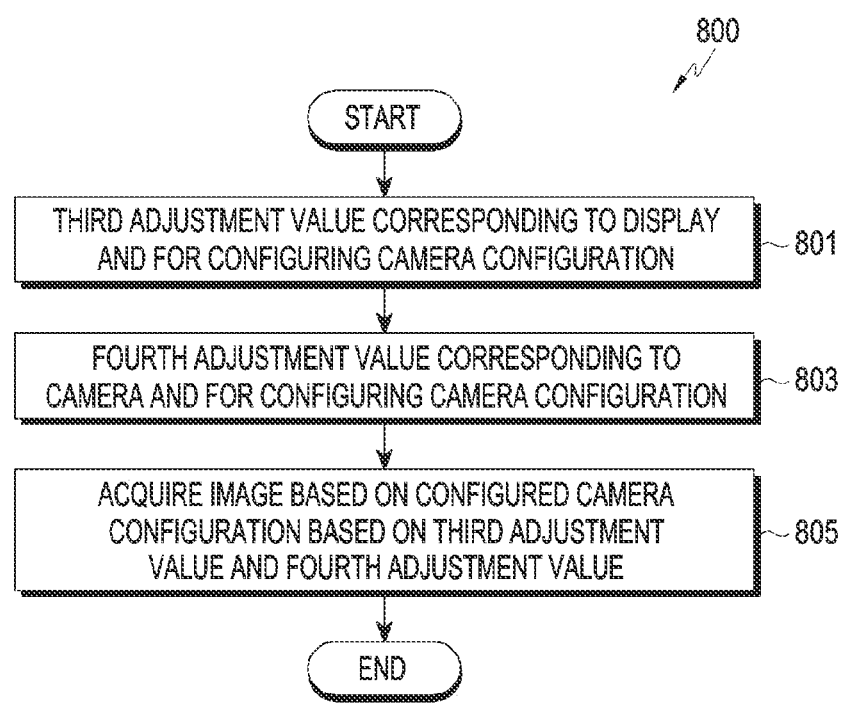
FIG. 8 is a flowchart illustrating a method of setting a camera setting according to an embodiment.

FIG. 8 illustrates a method 800 of setting camera setting according to an embodiment.

Referring to FIG. 8, in operation 801, the processor 340 may acquire a third adjustment value (hereinafter referred to as a "third adjustment value") corresponding to the display 310 and for setting camera setting. For example, the processor 340 may acquire information for camera setting related to the display 310 acquired through the operations of FIGS. 5A to 5C as the third adjustment value.

The processor 340 may acquire the third adjustment value from the memory of the display 310. However, the disclosure is not limited thereto. The processor 340 may acquire the third adjustment value from a server. For example, the processor 340 may identify unique identification information of the display 310. The processor 340 may request the third adjustment value corresponding to the unique identification information of the display 310 from the server through the communication module 180. The processor 340 may acquire the third adjustment value by receiving the third adjustment value corresponding to the unique identification information of the display 310 from the server through the communication module 180.

In operation 803, the processor 340 may acquire a fourth adjustment value (hereinafter referred to as a "fourth adjustment value") corresponding to the camera 320 and for adjusting a camera setting. For example, the processor 340 may acquire information for setting camera setting related to the camera acquired through the examples of FIG. 6 as the fourth adjustment value. However, the disclosure is not limited thereto. The processor 340 may acquire the fourth adjustment value from the server. For example, the processor 340 may identify unique identification information of the camera 320. The processor 340 may request the fourth adjustment value corresponding to the unique identification information of the camera from the server through the communication module 180. The processor 340 may acquire the fourth adjustment value by receiving the fourth adjustment value corresponding to the unique identification information of the camera from the server through the communication module 180.

In FIG. 8, acquiring the third adjustment value of operation 801 is exemplified as being performed before the acquiring of the fourth adjustment value of operation 803, but the disclosure is not limited thereto. For example, acquiring the fourth adjustment value in operation 803 may be performed before or simultaneously with (e.g., in parallel) acquiring the third adjustment value in operation 801.

The operation of FIG. 8 may be performed in response to the execution of the camera application. For example, the processor 340 may perform operations 801 and/or 803 in response to receiving an input for executing the camera application from a user.

In operation 805, the processor 340 may acquire an image based on camera setting set based on the third adjustment value and the fourth adjustment value.

The processor 340 may adjust the setting of the camera 320 based on the third adjustment value and the fourth adjustment value. For example, the processor 340 may correct a camera setting value related to a position of a lens for auto focus and/or a camera setting value for correcting an aberration of a lens based on the third adjustment value and the fourth adjustment value.

After the camera setting is set, the processor 340 may acquire the image through the camera 320 based on the set camera setting.

After the processor 340 acquires the image through the camera 320, the processor 340 may perform operations 703 to 707 of FIG. 7.

According to an embodiment, a method of providing an image in an electronic device may include acquiring the image through a camera that acquires an image using light introduced through a display of the electronic device, acquiring a first adjustment value for correcting the image, the first adjustment value corresponding to the display, acquiring a second adjustment value for correcting the image, the second adjustment value corresponding to the camera, and correcting the image based on the first adjustment value and the second adjustment value.

Acquiring the first adjustment value may comprise acquiring the first adjustment value from a memory of the display, and acquiring the second adjustment value may comprise acquiring the second adjustment value from a memory of the camera.

Acquiring the first adjustment value and acquiring the second adjustment value may comprise acquiring the first adjustment value and the second adjustment value from a server through a communication module of the electronic device.

Correcting the image may comprise correcting the image by adjusting at least one of white balance, lens shading, or color correction matrix (CCM) of the image based on the first adjustment value and the second adjustment value.

The first adjustment value may be acquired based on an image acquired by the camera by using light emitted from a light source and introduced through the display before the display is mounted in the electronic device.

A reference camera may be, among a plurality of cameras mountable to the electronic device, a camera having a characteristic value corresponding to an average of characteristic values of the plurality of cameras or a median value among the characteristic values of the plurality of cameras.

The second adjustment value may be acquired based on an image acquired by the camera by using light emitted from the light source before the camera is mounted in the electronic device.

The first adjustment value may be, based on an image acquired by the reference camera, acquired by an adjustment device communicatively connected to the reference camera, and the second adjustment value may be, based on the image acquired by the camera, acquired by the adjustment device communicatively connected to the reference camera.

The method may further include acquiring a third adjustment value for adjusting a camera setting, the third adjustment value corresponding to the display, acquiring a fourth adjustment value for adjusting a camera setting, the fourth adjustment value corresponding to the camera, and setting the camera setting, based on the third adjustment value and the fourth adjustment value.

Setting the camera setting may comprise setting the camera setting related to a position of a lens for auto focus and/or the camera setting for correcting an aberration of the lens, based on the third adjustment value and the fourth adjustment value.

In addition, the structure of the data used in the above-described embodiment may be recorded in a computer-readable recording medium through various means. The computer-readable recording medium includes a storage medium such as a magnetic storage medium (e.g., a ROM, a floppy disk, a hard disk, etc.) and an optically readable medium (e.g., a CD-ROM, a DVD, etc.).

While the present disclosure has been particularly shown and described with reference to certain embodiments thereof, it will be understood by those of ordinary skill in the art that various changes in form and details may be made therein without departing from the spirit and scope of the disclosure as defined by the appended claims and their equivalents.

What is claimed is:
1. An electronic device comprising:
a display;
a camera configured to acquire an image using light introduced through the display;
at least one processor configured to be electrically connected to the display and the camera, and
memory storing instructions that, when executed by the at least one processor, cause the electronic device to:
acquire the image through the camera,
acquire a first adjustment value for correcting the image, the first adjustment value corresponding to the display,
acquire a second adjustment value for correcting the image, the second adjustment value corresponding to the camera, and
correct the image, based on the first adjustment value and the second adjustment value,
wherein the first adjustment value is acquired based on an image acquired by a reference camera using light emitted from a light source and introduced through the display before the display is mounted in the electronic device, and
wherein the second adjustment value is acquired based on an image acquired by the camera by using light emitted from the light source before the camera is mounted in the electronic device.

2. The electronic device of claim 1, wherein the instructions, when executed by the at least one processor, cause the electronic device to:
acquire the first adjustment value from a memory of the display, and
acquire the second adjustment value from a memory of the camera.

3. The electronic device of claim 1, further comprising a communication circuitry,
wherein the instructions, when executed by the at least one processor, cause the electronic device to acquire the first adjustment value and the second adjustment value from a server through the communication circuitry.

4. The electronic device of claim 1, wherein the instructions, when executed by the at least one processor, cause the electronic device to correct the image, by adjusting at least one of white balance, lens shading, or color correction matrix (CCM) of the image based on the first adjustment value and the second adjustment value.

5. The electronic device of claim 1, wherein the reference camera, among a plurality of cameras mountable to the electronic device, has a characteristic value corresponding to an average of characteristic values of the plurality of cameras or a median value among the characteristic values of the plurality of cameras.

6. The electronic device of claim 1, wherein the first adjustment value is, based on an image acquired by the reference camera, acquired by an adjustment device communicatively connected to the reference camera, and
wherein the second adjustment value is, based on the image acquired by the camera, acquired by the adjustment device communicatively connected to the reference camera.

7. The electronic device of claim 6, wherein the instructions, when executed by the at least one processor, cause the electronic device to:
acquire a third adjustment value for adjusting a camera setting, the third adjustment value corresponding to the display,
acquire a fourth adjustment value for adjusting the camera setting, the fourth adjustment value corresponding to the camera, and
set the camera setting, based on the third adjustment value and the fourth adjustment value.

8. The electronic device of claim 7, wherein the instructions, when executed by the at least one processor, cause the electronic device to set the camera setting related to a position of a lens for auto focus and/or the camera setting for correcting an aberration of the lens, based on the third adjustment value and the fourth adjustment value.

9. A method of providing an image in an electronic device, the method comprising:
acquiring the image through a camera configured to acquire an image using light introduced through a display of the electronic device, the camera being included in the electronic device;
acquiring a first adjustment value for correcting the image, the first adjustment value corresponding to the display;
acquiring a second adjustment value for correcting the image, the second adjustment value corresponding to the camera; and
correcting the image, based on the first adjustment value and the second adjustment value,
wherein the first adjustment value is acquired based on an image acquired by a reference camera by using light emitted from a light source and introduced through the display before the display is mounted in the electronic device, and
wherein the second adjustment value is acquired based on an image acquired by the camera by using light emitted from the light source before the camera is mounted in the electronic device.

10. The method of claim 9, wherein acquiring the first adjustment value comprises acquiring the first adjustment value from a memory of the display, and
wherein acquiring the second adjustment value comprises acquiring the second adjustment value from a memory of the camera.

11. The method of claim 9, wherein acquiring the first adjustment value and acquiring the second adjustment value comprise acquiring the first adjustment value and the second adjustment value from a server through communication circuitry of the electronic device.

12. The method of claim 9, wherein correcting the image comprises correcting the image, by adjusting at least one of white balance, lens shading, or color correction matrix (CCM) of the image based on the first adjustment value and the second adjustment value.

13. The method of claim 9, wherein the reference camera is, among a plurality of cameras mountable to the electronic device, the reference camera having a characteristic value corresponding to an average of characteristic values of the plurality of cameras or a median value among the characteristic values of the plurality of cameras.

14. The method of claim 9, wherein the first adjustment value is, based on an image acquired by the reference camera, acquired by an adjustment device communicatively connected to the reference camera, and
wherein the second adjustment value is, based on the image acquired by the camera, acquired by the adjustment device communicatively connected to the reference camera.

15. The method of claim 9, further comprising:
acquiring a third adjustment value for adjusting a camera setting, the third adjustment value corresponding to the display;
acquiring a fourth adjustment value for adjusting the camera setting, the fourth adjustment value corresponding to the camera; and
setting the camera setting, based on the third adjustment value and the fourth adjustment value.

16. The method of claim 15, wherein setting the camera setting comprises setting the camera setting related to a position of a lens for auto focus and/or the camera setting for correcting an aberration of the lens, based on the third adjustment value and the fourth adjustment value.

17. A non-transitory computer-readable medium having recorded thereon computer executable instructions, the computer executable instructions that, when executed by at least one processor of an electronic device, cause the electronic device to:
acquire the image through a camera configured to acquire an image using light introduced through a display of the electronic device, the camera being included in the electronic device;
acquire a first adjustment value for correcting the image, the first adjustment value corresponding to the display;
acquire a second adjustment value for correcting the image, the second adjustment value corresponding to the camera; and
correct the image, based on the first adjustment value and the second adjustment value, wherein the first adjustment value is acquired based on an image acquired by a reference camera using light emitted from a light source and introduced through the display before the display is mounted in the electronic device, and wherein the second adjustment value is acquired based on an image acquired by the camera by using light emitted from the light source before the camera is mounted in the electronic device.

\* \* \* \* \*